United States Patent [19]

Hauk et al.

[11] 4,295,526
[45] Oct. 20, 1981

[54] METHOD AND APPARATUS FOR CONNECTING STEEL PIPE SECTIONS

[75] Inventors: Ernest D. Hauk, Yucca Valley; Larry Stewart, Joshua Tree, both of Calif.

[73] Assignee: Service Equipment Design Co., Inc., Signal Hill, Calif.

[21] Appl. No.: 13,671

[22] Filed: Feb. 21, 1979

[51] Int. Cl.³ .................. E21B 43/10; B23P 19/04; B23Q 3/00; F16L 21/04
[52] U.S. Cl. .................. 166/315; 29/237; 29/464; 29/525; 166/71; 166/242; 285/369
[58] Field of Search ............. 166/315, 242, 71; 285/369, 383, 345, 331, 334.2, 334.5, 398; 175/135, 171, 458; 29/506, 507, 522 R, 542; 405/251, 255, 305

[56] References Cited

U.S. PATENT DOCUMENTS

| | | | |
|---|---|---|---|
| 672,556 | 4/1901 | Hunick | 166/242 X |
| 808,923 | 1/1906 | Herrick . | |
| 1,368,196 | 2/1921 | Peck . | |
| 1,762,766 | 6/1930 | Garay . | |
| 1,857,297 | 5/1932 | Faulkner | 285/369 X |
| 1,921,642 | 8/1933 | Stephenson . | |
| 1,921,978 | 8/1933 | Leary . | |
| 2,900,028 | 8/1959 | Hanes | 166/242 |
| 2,950,087 | 8/1960 | Gregory | 175/171 X |
| 3,064,983 | 11/1962 | Halterman | 285/345 X |
| 3,604,522 | 9/1971 | Doughty | 175/171 X |
| 3,734,212 | 5/1973 | Perlewitz | 175/171 |
| 3,924,413 | 12/1975 | Marsh, Jr. | 285/345 X |
| 3,945,444 | 3/1976 | Knudson | 175/171 X |
| 4,057,108 | 11/1977 | Broussard | 166/242 X |
| 4,176,863 | 12/1979 | Wetmore | 166/315 X |

Primary Examiner—James A. Leppink
Assistant Examiner—George A. Suchfield
Attorney, Agent, or Firm—Gausewitz, Carr, Rothenberg & Edwards

[57] ABSTRACT

The method comprises providing an extremely strong and elastic alloy steel ring having a inner diameter substantially smaller than the outer diameter of the pipe to be joined, and an outer diameter much larger than such outer diameter of the pipe. Great axial forces are then employed to insert the pipe ends into the ring until an internal flange is abutted, thus stretching the ring without causing it to exceed its elastic limit. End seals are provided on the flange faces and are pinched off by the pipe ends, so that metal-to-metal contact results. Prior to forcing the pipe ends into the ring, it is mounted in an internal groove in a hinged clasp which aligns the pipe ends.

The apparatus comprises the ring, the clasp and the seals, and further comprises the completed joint wherein the ring is under continuous great hoop stress.

15 Claims, 9 Drawing Figures

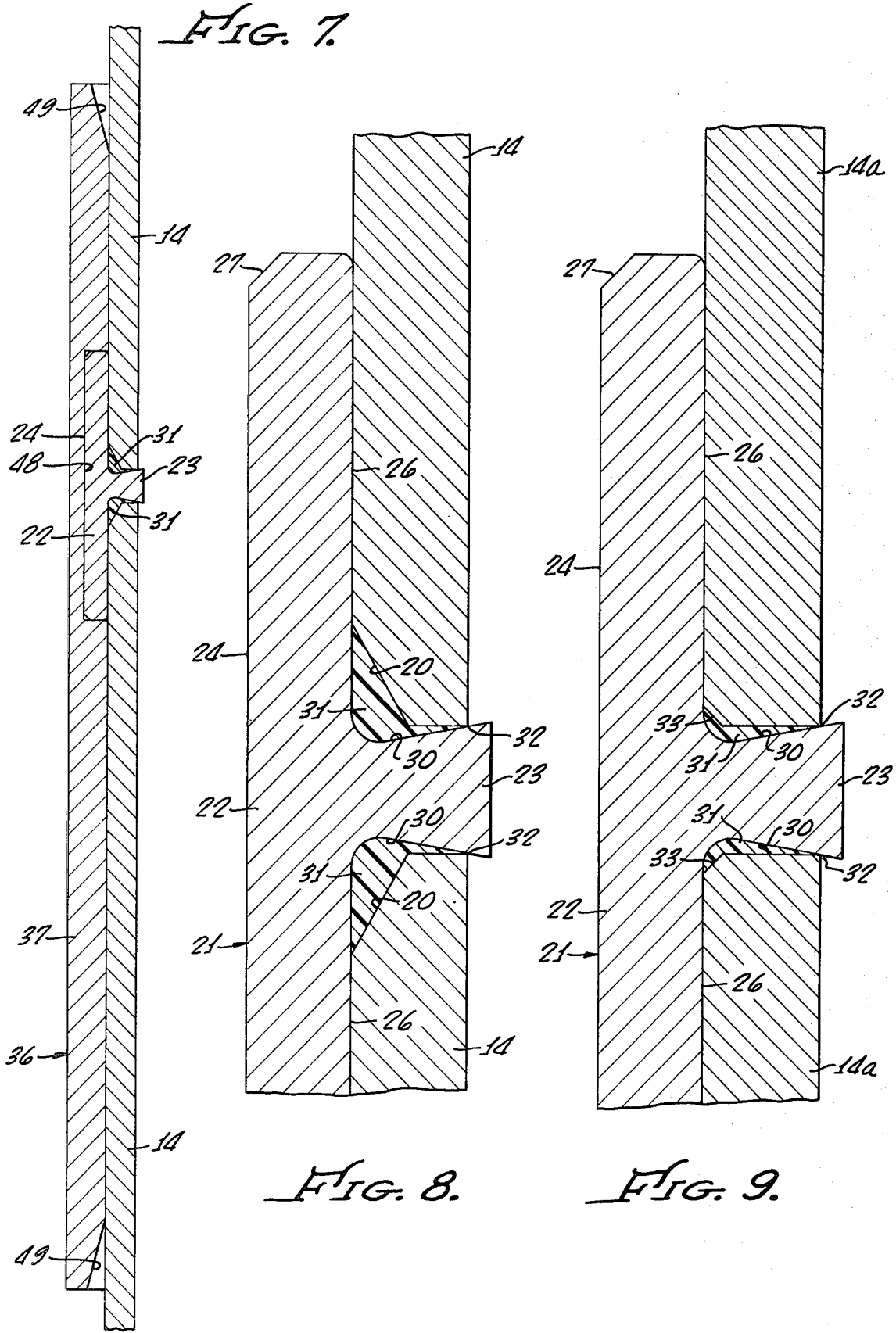

METHOD AND APPARATUS FOR CONNECTING STEEL PIPE SECTIONS

BACKGROUND OF THE INVENTION

1. Field of the Invention

This invention relates to the field of connecting cylindrical metal pipe sections in endwise relationship to thus form a long string of sealed pipe.

2. Description of Prior Art

It is conventional practice to connect steel pipe sections used for water well casing, for gas pipe lines, etc., by means of welding. Each circumferential weld between the abutted ends of pipe sections takes a long time to make.

Various attempts have been made to connect pipe sections in the absence of welds or threads, but insofar as applicants are aware no prior-art solution has been sufficiently practical or successful to supplant to any substantial degree the conventional circumferential welding practice state above.

Among the inadequacies and deficiencies of the prior art known to applicants are the following: (a) The rings were insufficiently strong and elastic, and/or it was not realized that the rings should not be stretched beyond their elastic limit. (b) The relationships relative to size, amount of stretching, wall thickness, etc., were not such as to do a practical job of connecting the pipe sections. Furthermore, the materials employed were inadequate for the purpose. (c) Reliance was frequently placed on belling or outward bending of the pipe ends, instead of relying substantially entirely on extremely strong frictional gripping relationships resulting from enormous hoop stresses in strong elastic encircling alloy steel bands. (d) The sealing means were incorrect in material and/or location, or were impractical to employ. (e) No encircling clasp means was employed during the connection procedure to effect correct alignment and prevent improper connections and inadequate sealing. (f) There was frequently much structure inside the pipe, which interfered with flow of fluid therethrough and with movement of tools therethrough. (g) Gluing of the pipe sections in the rings was sometimes resorted to, and was inadequate for the purposes intended by the present applicants. In summary, the relative sizes, pressures, materials, shapes, etc., were not such as to permit achievement of the great, practical results which applicants have now achieved.

SUMMARY OF THE INVENTION

A very strong, elastic alloy steel ring having critical dimensions in relation to the steel pipe sections to be joined is stretched a substantial and critical amount, very preferably without exceeding its elastic limit. Such stretching is done by forcing the ends of steel pipe sections into opposite sides of the ring. The forcing is effected by using pressures of many thousands of pounds. The inner surfaces of the ring are cylindrical, and lock frictionally with the outer cylindrical faces of the pipe ends. The ring is very strong and elastic, and under great hoop stress, the result being that the frictional forces locking the ring to the pipe ends create surprisingly great resistance to torquing or pulling-apart of the connected pipe sections.

There is an internal flange integral with the ring, and which stretches outwardly therewith. Such flange is abutted by the ends of the steel pipe sections. Sealing means, preferably in the form of rings which seat on the flange faces, are compressed by the pipe ends and caused to flow until voids are substantially filled, thus achieving excellent seals. The inner regions of the seals are pinched between the flange and the pipe ends and are thus cut off.

Before the pipe ends are inserted into the ring, external clasp means are mounted therearound, the construction being such that the ring is seated within the clasp means. It is thus made certain that the pipe ends will enter the ring in proper alignment and at proper positions. After each joint is completed, the clasp means is removed.

Stated more definitely, the ring is a high-yield chrome-molybdenum alloy steel, preferably No. 4130.

In practicing the method in a water well, power hammer means are employed to pound casing sections into the ring and also into the ground.

BRIEF DESCRIPTION OF THE DRAWINGS

FIG. 7 is a vertical sectional view corresponding to the left portion of FIG. 5 but showing the positions of the parts after the pipe ends have been fully inserted into the ring to stretch the same and to compress and extrude the seals;

FIG. 8 is a greatly enlarged view corresponding to the central region of FIG. 7, but without the clasp; and FIG. 9 is a view corresponding to FIG. 8 but showing pipe ends which are not bevelled for welding.

DETAILED DESCRIPTION OF THE PREFERRED EMBODIMENTS

The method and apparatus are described herein as employed in creating a casing in a water well. It is to be understood, however, that certain aspects of the method and apparatus may also be employed for other purposes, for example connecting gas main sections to each other. Although hammering of the pipe sections into the rings is now preferred and is the best mode contemplated by the inventors for water wells, it is also contemplated that hydraulic or other means may be employed to force pipe sections into the rings for example to form joints in gas mains. Such hydraulic means would be employed in connection with means which grip the pipes and permit hydraulic or other forces to pull the pipe ends forcibly into the rings.

Figure 1:
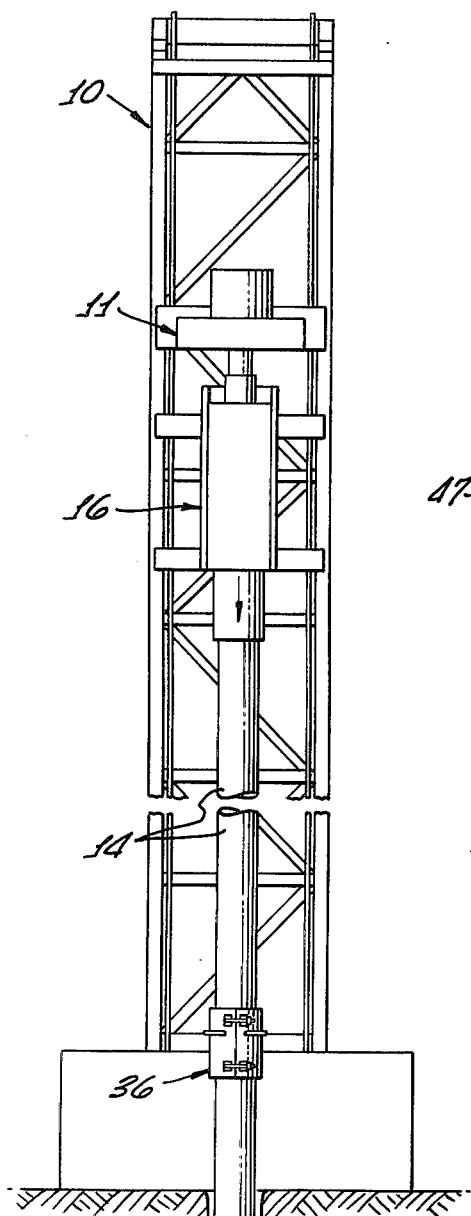
FIG. 1 is an elevational view showing the mast or tower used in drilling a water well, showing a joint ring between two sections already in the ground, also showing the clasp around a joint being made above ground.

In the drilling rig shown in FIG. 1, a mast or tower 10 (which is usually mounted on a truck) is adapted to support in vertically moveable relationship a crosshead 11. The crosshead incorporates and is associated with power means adapted to rotate a drilling string which extends downwardly into the earth 12 and terminates, at its lower end, at a drilling bit 13. The drilling string is disposed telescopically within tubular pipe sections or casing sections 14 which are mounted in coaxial relationship and are adapted to be driven into the earth 12 by power hammer means indicated at 16.

Welded at the lower end of the casing string is a relatively large-diameter shoe 17 which has a sharp cutting edge and is adapted to cut, in response to hammering of the casing string by power hammer means 16, a hole or bore 18 in earth 12. The shoe being substantially larger than the casing, so is the hole 18. Suitable means are provided to remove from the bottom of the bore 18 the earth and rock removed in response to rotation of bit 13. For a more detailed description of the overall arrangement, reference is made to co-pending patent application Ser. No. 888,312, filed Mar. 20, 1978, for a Method and Apparatus for Driving Pipe, which application is hereby incorporated by reference herein as though set forth in full.

Conventionally, casing sections 14 are welded together only by means of circumferential welds which are made at the bevelled outer edges 20 (FIG. 8). In accordance with the present method and apparatus, the primary and often the sole connection between two pipe sections 14 is a connecting ring 21. Such ring is described in detail below, as are the sealing means and clasp employed in association therewith.

THE CONNECTING RINGS

Figure 2:
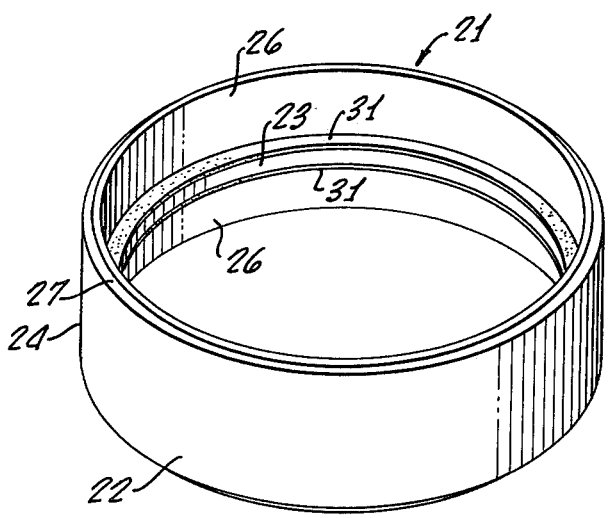
FIG. 2 is an isometric view of only the ring.
Figure 6:
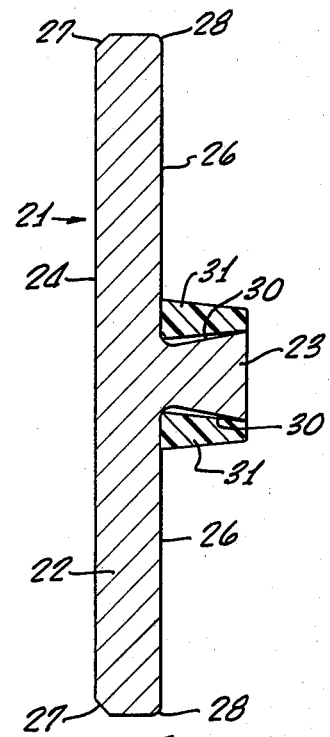
FIG. 6 is an enlarged vertical sectional view of the ring prior to compression and flow of the seals.

Referring particularly to FIGS. 2 and 6, each connecting ring 21 has a short tubular body 22 the central region of which is integral with an inwardly-projecting annular flange 23. Body 22 has an exterior cylindrical surface 24 which is coaxial with an internal cylindrical surface 26, the latter being divided into two regions by flange 23.

The outer corners of body 22 are bevelled at 27 to minimize the possibilities of interference with the wall of the well hole or bore 18. Similarly, to a much smaller degree, the internal end surfaces are bevelled or rounded at 28. The latter bevels facilitate entry of the pipe ends without galling or gouging.

Pipe sections 14 have cylindrical exterior surfaces which are substantially larger in diameter than is the interior surface 26 of each ring 21, prior to stretching of the ring 21 as described below. The diameter of the exterior ring surface 24 is much larger than the diameter of the outer pipe surface. The wall thickness of the tubular ring body 22 is in the same general size range as is the wall thickness of the pipe itself, but the ring thickness is preferably somewhat less than that of the pipe.

The relationship between the diameter of interior ring surface 26 and the exterior diameter of each pipe section 14 is such that the following conditions are met: (a) Forcing of the pipe ends into the ring will not cause crushing of the pipe, (b) such forcing will effect stretching of the ring a very substantial amount to create great hoop stresses and consequent very large frictional gripping forces between surface 26 and the exterior pipe surfaces. (c) The elastic limit of the ring will, very preferably, not be exceeded. (e) The amount of gripping will be such that many thousands of pounds of axial force may be applied in an attempt to pull the pipe sections 14 apart without doing so, and such that great rotational forces may be applied to each section of pipe without resulting in slippage in any ring. The dimensions and relationships are selected in conjunction with the critically important material forming each ring 21 as described below. Each ring is sufficiently thick to provide structural integrity to the pipe string, and sufficiently thin to expand substantially in response to forcing of the pipe ends therein.

Stated more definitely, the amount of diametral stretching of the ring in response to insertion of the pipe ends is in the range of about $\frac{1}{3}$ percent to about $\frac{2}{3}$ percent of the pipe diameter. Thus, for example, relative to nominal six-inch pipe 14, the diameter increase caused by stretching is in the range of about 0.020 inch to about 0.040 inch, the optimum stretch being substantially 0.030 inch.

As a specific example of the diameter relationships for the nominal six-inch pipe 14, the diameter of surface 24 is seven inches, that of surface 26 is 6.608 inches. The internal diameter of flange 23 is six inches. The exterior diameter of pipe sections 14, in the example, is 6.638 inches on average. The exemplary wall thickness of the pipe is either substantially 0.250 inch or substantially 0.188 inch, although 0.250 is preferred. It is to be noted that the 6.638 average outer diameter of pipe sections 14 is about 0.030 smaller than the stated 6.608 diameter of ring surface 26.

As previously indicated, the material of the ring 21 is critically important. Such ring is a high-yield alloy steel having great elasticity and strength. The steel is one which will stretch the above-specified amounts without breaking and preferably without exceeding its elastic limit—so that the extremely strong hoop stresses remain to effect gripping between surface 26 and the exterior pipe surfaces. A chromium (chrome)molybdenum steel is greatly preferred. More specifically, the preferred steel employed to form each ring is No. 4130, normalized. Such steel has the following composition:

| | |
|---|---|
| Carbon | 0.28 to 0.33 percent |
| Manganese | 0.40 to 0.60 percent |
| Phosphorous | 0.035 percent maximum |
| Sulphur | 0.040 percent maximum |
| Silicon | 0.20 percent to 0.35 percent |
| Chromium | 0.80 percent to 1.10 percent |
| Molybdenum | 0.15 percent to 0.25 percent. |

The vertical dimension of the ring, at regions both above and below flange 23, is selected to create sufficiently large frictional bearing areas, between surface 26 and the exterior pipe surfaces, without resulting in excessive sizes and amounts of alloy steel for the rings. In the example relating to a six-inch pipe, the frictional bearing dimension above and below flange 23 is slightly under one inch. Thus, the ring 21 is about 2.2 inches long in the example.

Each ring 21 may be machined from a pipe of the specified composition, then being no need to machine the exterior surface 24 or the interior cylindrical surface of the flange 23 which serves an an anvil. The machining cuts are taken to form the surface 26 and to form the upper and lower faces (described below) of the internal flange or anvil 23.

THE SEALING MEANS

It is highly important in many applications to insure that no fluid may enter or leave the pipe sections 14 through the joint effected at each ring 21. For example, in a water well there may be regions of bad water relatively near the surface and which must be effectively sealed off from the interior of the casing so that the good water from lower regions may pass upwardly to the surface in uncontaminated condition.

In accordance with one aspect of the present invention, the flange or anvil 23 and associated seals are so constructed that effective end seals will result regardless of whether or not the casing ends have large bevels such as are conventionally provided for welding (edges 20, FIG. 8).

As best shown in FIG. 6, the upper and lower faces 30 of the anvil are tapered, preferably at about a ten degree angle to the horizontal. The upper face is the frustum of a cone and is downwardly divergent, whereas the lower face is the mirror image of the upper face—being therefore a cone frustum which is downwardly convergent. In the example for a six-inch pipe, the distance between faces 30 at the region adjacent surface 26 is approximately 0.20 inch. At such region, the surfaces 30 converge with the surface 26 through rounded or concave areas, the radiuses of which typically are 0.060 inch.

Sealing rings 31 are provided on the anvil faces 30 as shown in FIGS. 2 and 6. The sealing rings are non-metallic and soft. Each such ring 31 is preferably injection molded, having exterior and interior concentric cylindrical surfaces and having generally horizontal outer surfaces. The surfaces of the rings, adjacent faces 30 are inclined, preferably at about the same angle (such as ten degrees). The sealing rings are sized to be a light press fit within the surface 26. As a specific example, again for six-inch pipe, the vertical dimension of each sealing ring 31 at its innermost point may be 0.060 inch, whereas the radial dimension of each such ring may be 0.28 inch. Each sealing ring is preferably formed of flexible polyurethane, but may also be neoprene or various other materials.

Referring to FIG. 6, it will be noted that the sealing ring 31 has substantial bulk. However, as shown in FIGS. 7 and 8 there is a great deal of "flow" or extrusion of the ring material in response to the tremendous axial forces exerted upon the casing sections. These axial forces are continued until, at the inner pipe surface as shown at the corner 32 in FIG. 8, there is metal-to-metal contact between the inner region of each pipe (casing) section and the associated anvil face 30.

The excess ring material is extruded out past the corners 32 and is cut off when the metal-to-metal contact is made at such corners. The voids located outwardly of corners 32 are substantially filled with the sealing material despite the presence of the bevels 20 which in conventional wells are used for welding purposes as above-indicated.

Referring to FIG. 9, this is identical to FIG. 8 except that there are no bevelled edges 20 for welding purposes. Instead, there are very small bevels 33. The same sealing rings may be employed as described above, more material then being extruded inwardly and cut off at corners 32 due to the smaller voids between the pipe ends and the anvil faces. Alternatively, the thickness of each sealing ring may be reduced for this type of construction.

THE REMOVABLE CLASP

Figure 4:
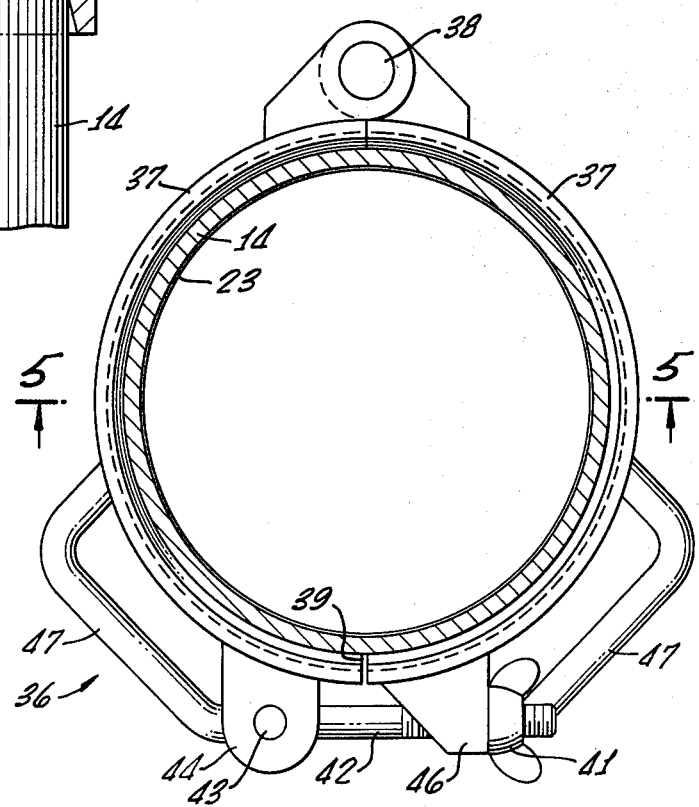
FIG. 4 is a horizontal sectional view taken through the pipe at a region near the clasp.

Before the great axial pressures are applied for forcing of pipe sections 14 into the opposite sides of a ring 21, means are provided to insure that everything will be in alignment but without detracting from the effectiveness of the axial pressures. Such means comprises a clasp apparatus 36 having two semi-cylindrical halves 37 which are hinged together (at one set of opposing edges) by hinge means 38. The inner diameters of the semi-cylindrical sections 37 correspond, when the clasp is closed, to the outer diameter of the pipe forming the casing sections 14. When the clasp is closed on the pipe sections, there is a small gap present at 39 (FIG. 4) so that the amount of closing pressure is not determined by the sizes of sections 37 but instead by the forces exerted by wing nuts 41 next to be described.

Nuts 41 are threaded on bolts 42 which are preferably eye bolts, there being pivot pins 43 extended vertically through the eyes and also through ears 44 which are welded to one of sections 37 on one side of gap 39. Welded to the other section 37, at the opposite side of gap 39, are generally U-shaped elements 46 which are sufficiently large in diameter to receive laterally therein the bolts 42.

The clasp may be closed by holding suitable handles 47 and effecting pivotal movement about hinge 38, following which the bolts 42 are swung into positions in elements 46. The wing nuts 41 may then be tightened against the outer faces of elements 46 to create the desired amount of clasp or gripping pressure on the casing sections 14.

Figure 3:
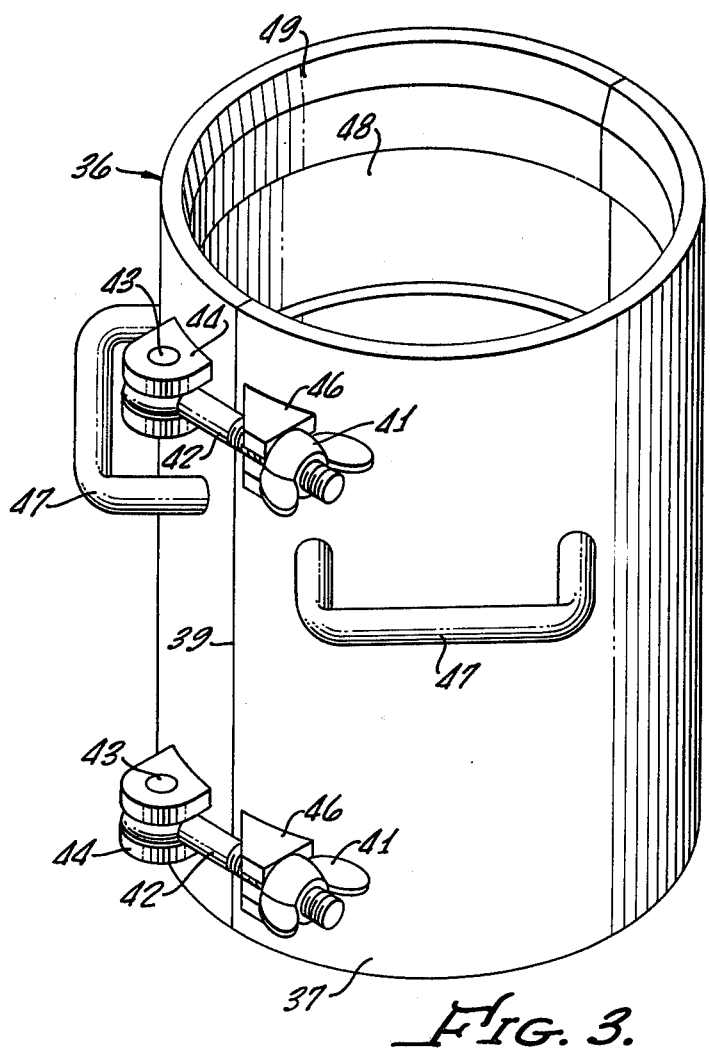
FIG. 3 is an isometric view of the clasp.
Figure 5:
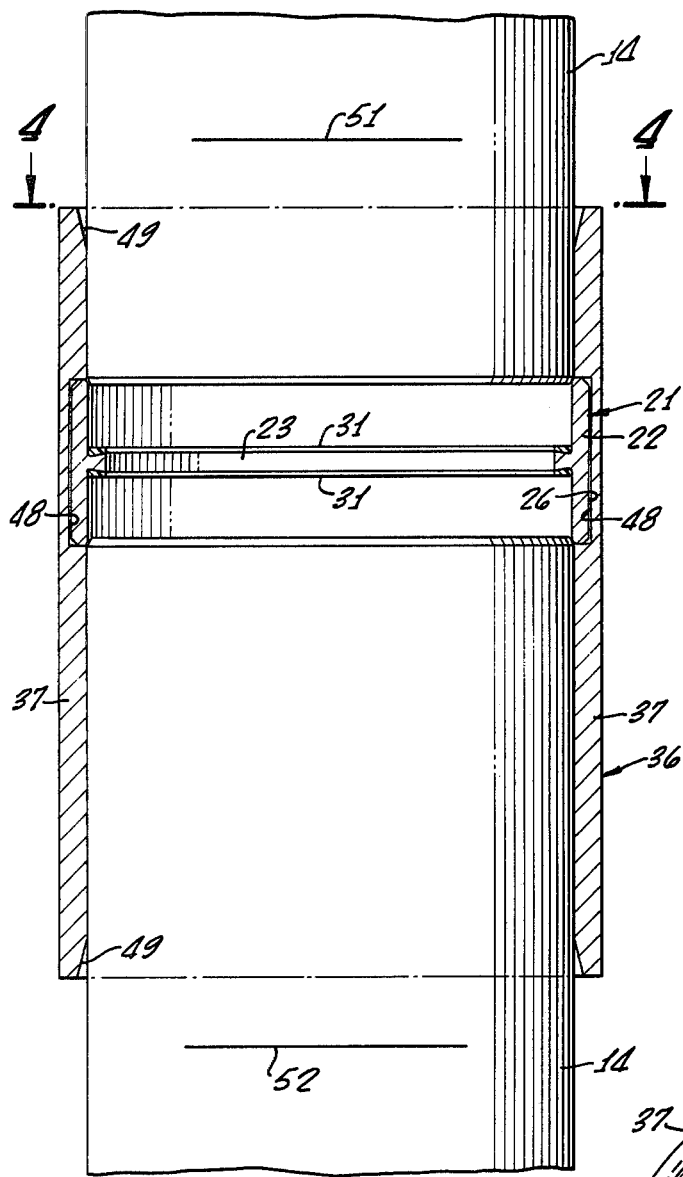
FIG. 5 is a vertical sectional view on line 5—5 of FIG. 4, showing the positions just prior to the time that the pipe ends are forced into the ring.

Referring to FIGS. 3, 5 and 7, there is formed in the clasp an internal annular groove 48 adapted to receive each of the rings 21. The groove 48 is sufficiently deep that a ring will seat fully therein except at the anvil 23. Sufficient radial clearance is provided outwardly of ring surface 24 to permit the stretching which occurs as the casing section ends are driven into the ring. Preferably, groove 48 is located relatively near the upper end of the clasp apparatus 36. At its ends, the clasp is internally bevelled at 49 to facilitate entry of the pipe ends.

SUMMARY OF THE METHOD AS EMPLOYED IN A WATER WELL

Let it be assumed that one or more casing sections have already been inserted into the earth 12, and that the upper end of one casing section is a few feet above ground. Correspondingly, the upper end of the drill string within such casing section is a few feet above ground.

As the next step, a connector ring 21 is mounted within the clasp 36, and the clasp is loosely closed and telescoped over the upper end of the casing section which thus projects from the well hole. The clasp is pushed down manually over the upper casing end as far as it will go, which is until the lower edge of ring 21 seats on the upper end of casing 14 as shown in FIG. 5. The wing nuts 41 are then tightened until they are finger tight, no wrench being employed.

The next section of casing 14, having a drill string section telescopically contained therein, is then placed in the mast 10 of the drilling rig and associated with crosshead 11 and hammer means 16. Then, before the lower end of the casing section is stabbed downwardly into the clasp, a joint is made between the lower end of the upper drill string section and the upper end of the drill string section which is already in the ground. Thereafter, the casing section in mast 10 is lowered by gravity so as to stab into clasp 36, this action continuing until the upper corner of the connecting ring 21 is abutted as shown in FIG. 5. The weight of the casing section is normally sufficient to overcome the frictional resistance presented by the clasp.

Marks are then made on the casing sections above and below clasp 36, as shown at 51 and 52 in FIG. 5. These marks are preferably made by means of a suitable template, and are correlated to the location of the upper and lower edges of the clasp. The vertical distances between the marks and the adjacent clasp edges correspond to the distances that the casing ends must penetrate into ring 21 in order to seat on anvil 23.

The power hammer 16 is then operated for a few seconds, for example to strike three or four blows, and these blows are caused to have a force sufficient to force the casing ends into ring 21 until the anvil is abutted. To be sure that this has occurred, a visual check is made to see that the marks 51 and 52 are, respectively, in the same horizontal planes as are the upper and lower edges of the clasp.

The clasp performs the very important function of insuring that the pipe ends are square and vertical, of insuring ring, and of preventing any cocking or other malfunction. However, the degree of tightening of the clasp is not so great as to diminish substantially the effectiveness of the hammer means in driving the pipe ends into the ring.

As the next step, the wing nuts 41 are loosened and the bolts 42 swung outwardly. The clasp 36 is then lifted away from the joint thus made.

Thereafter, the hammer means 16 is further operated and the drill string is rotated to cause the drill string and casing string to penetrate further into the earth.

The amount of axial force employed to force the pipe ends into the ring is tens of thousands of pounds, preferably in excess of thirty-thousand pounds or forty-thousand pounds, for the six-inch pipe described in the present example. The thus-made joint will withstand a tensile force of about twenty to thirty thousand pounds in the exemplary six-inch pipe, which is important since the operator of the rig may wish to lift the casing string in order to eliminate a possible jam adjacent bit 13. Furthermore, occasionally the bit will jam below or in the string, for example due to falling of debris, and cause the string to rotate, and this is done in accordance with the present invention without breaking any joint when the well is of reasonable depth.

When the casing string is one which is likely to be pulled, it is sometimes advisable as a precautionary measure to make tack welds between ring 21 and the pipe sections, this being done in a few minutes as distinguished from the approximately half-hour per joint which is required for full circumferential welds between the pipe sections. The above-specified alloy is weldable to the mild steel forming the casing.

Because of the inclination of anvil faces 30, any tendency of the pipe ends to move radially will be outward instead of inward. However, any substantial belling of the lower end of the upper casing section, or of the upper end of the lower section, is not desired.

Because of the metal-to-metal contact at corners 32 (FIGS. 8 and 9), the hammering action is in no way absorbed by the sealing material. Thus, the driving of the casing into the ground is not substantially affected by the present ring joints.

The foregoing detailed description is to be clearly understood as given by way of illustration and example only, the spirit and scope of this invention being limited solely by the appended claims.

We claim:

1. A method of forming a casing string in a well, comprising:
    (a) providing a plurality of sections of casing pipe having a predetermined outer diameter,
    (b) introducing one such section into the well hole,
    (c) providing a joint ring formed of strong and elastic material,
        said joint ring having an inner diameter sufficiently smaller than said predetermined outer diameter of said pipe sections that entry of opposed ends of said pipe sections into said ring will expand said ring and thus cause it to frictionally grip said ends very tightly,
    (d) providing a clasp means adapted to hold said joint ring and also adapted to receive and align the ends of said pipe sections whereby said ends may enter properly the opposite sides of said ring,
    (e) placing said joint ring in said clasp means, and introducing the ends of said one casing section and a second casing section into said clasp means to thus cause said ends to be in coaxial relationship with said clasp means and coaxially aligned with each other,
    (f) applying large axial forces to said coaxially-aligned pipe sections to cause said ends thereof to be forced into said ring and to be frictionally gripped therein while said ring is thus held in said clasp means,
    (g) removing said clasp means, and
    (h) repeating said steps (b) through (g) with additional ones of said joint rings and casing sections until the casing string has attained the desired length.

2. The invention as claimed in claim 1 in which said large axial forces are applied by pounding downwardly on the upper one of said casing sections by means of a power hammer to cause both of said section ends to enter said ring, and further to cause downward movement of the lower casing section into the well.

3. The invention as claimed in claim 1 in which said method further comprises employing as said clasp means a plurality of clasp sections adapted to open, after forming of each joint, for lateral movement away from the casing string, and in which said method further comprises tightening said clasp means, prior to formation of each joint, with sufficient force to achieve alignment of the opposed casing ends but with insufficient force to prevent axial movement of the ends to achieve the joint.

4. The invention as claimed in claim 3 in which said method further comprises employing as said ring a substantially cylindrical element having central internally-extending flange means adapted to be abutted by the ends of the casing sections after formation of the joint.

5. The invention as claimed in claim 1, in which said method further comprises employing as said joint ring a short steel body which is cylindrical and circumferentially continuous, the wall of said body being sufficiently thin that said body will expand a substantial amount when a pipe section is driven therein, and being sufficiently thick to provide structural integrity to the pipe string.

6. The invention as claimed in claim 5, in which said method further comprises employing as said cylindrical body a body having annular flange means provided internally, coaxially, and generally centrally thereof.

7. The invention as claimed in claim 6 in which said method further comprises employing sealing rings on the upper and lower surfaces of said flange means for abutment by the ends of the pipe sections.

8. A method of forming a casing string in a well, comprising:

(a) providing a plurality of sections of steel casing pipe having a predetermined outer diameter, (b) introducing the first such section into the well hole, (c) providing a joint ring formed of a highly strong and elastic alloy steel, said joint ring having an inner diameter substantially smaller than said predetermined outer diameter but insufficiently smaller that entry of the ends of said pipe sections into said ring will cause said steel to exceed its elastic limit, whereby hammering the ends of said first section and an additional section into said ring will expand the ring and thus cause it to frictionally grip said ends very tightly, said joint ring having a coaxial interior flange forming an anvil on which said section ends seat, (d) seating said joint ring coaxially on the upper end of said first section, (e) providing a tightenable clasp means around said joint ring and around the ends of said casing sections adjacent said ring, (f) tightening said clasp means sufficiently to ensure alignment of said ends whereby said ends will be square and aligned and will be pounded properly into said ring, (g) seating the lower end of said additional section coaxially on said joint ring, and pounding downwardly on said additional section by means of a power hammer to cause both of said section ends to enter said ring and seat on said anvil, (h) removing said clasp means subsequently to the pounding, (i) continuing said downward pounding to drive said additional section into the well, and (j) repeating said steps (c) through (i) with additional ones of said joint rings and casing sections until the casing string has attained the desired length.

9. The invention as claimed in claim 8, in which said method further comprises providing marks on said casing sections after the same have seated on opposite ends of said ring, and employing said marks to determine whether or not the casing section ends have seated on said anvil after completion of said step (a).

10. The invention as claimed in claim 8, in which said method further comprises providing soft nonmetallic seal means on opposite faces of said anvil, whereby to insure that sealing will result when said anvil is engaged by said casing section ends.

11. The invention as claimed in claim 9, in which said method further comprises so shaping said anvil that said seal means will be pinched off by the casing section ends, and the inner edges of said ends will be in metal-to-metal contact with said anvil.

12. The invention as claimed in claim 8, in which said method further comprises causing the wall thickness of said joint ring to be in the same general size range as the wall thickness of said casing sections.

13. The invention as claimed in claim 8, in which said joint ring is a cylinder formed of a chrome-molybdenum alloy steel.

14. The invention as claimed in claim 13, in which said alloy is number 4130.

15. The invention as claimed in claim 13, in which said steel is normalized.

* * * * *